US012704589B2

(12) United States Patent
Sanson et al.

(10) Patent No.: US 12,704,589 B2
(45) Date of Patent: Aug. 11, 2026

(54) DIGITAL MODULATOR RADAR TRANSMITTER LEAKAGE CANCELLATION USING FREQUENCY TEMPORAL FILTERING

(71) Applicant: GM Cruise Holdings LLC, San Francisco, CA (US)

(72) Inventors: Jessica Sanson, Munich (DE); Andre Giere, Oberpframmern (DE); Gustavo Adolfo Guarin Aristizabal, Munich (DE); Jorge Julio Jacome Munoz, Munich (DE); Kalin Kabakchiev, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 387 days.

(21) Appl. No.: 18/302,756

(22) Filed: Apr. 18, 2023

(65) Prior Publication Data

US 2024/0353526 A1 Oct. 24, 2024

(51) Int. Cl.
*G01S 7/03* (2006.01)
*G01S 7/35* (2006.01)
*G01S 13/38* (2006.01)

(52) U.S. Cl.
CPC ................ *G01S 7/038* (2013.01); *G01S 7/35* (2013.01); *G01S 13/38* (2013.01)

(58) Field of Classification Search
CPC . G01S 7/038; G01S 7/35; G01S 13/38; G01S 7/023
See application file for complete search history.

(56) References Cited

U.S. PATENT DOCUMENTS 4,197,540 A 4/1980 Riggs et al.
4,896,159 A * 1/1990 Sabatini .................. G01S 13/20 342/149
6,100,845 A * 8/2000 Rose ......................... G01S 5/04 342/417
9,213,095 B2 * 12/2015 Huizing .................. G01S 13/86
10,416,282 B2 * 9/2019 Perez-Ramirez ....... G01S 7/021
10,564,257 B2 * 2/2020 Martone ................. G01S 7/023
2005/0242985 A1 * 11/2005 Ponsford ............... G01S 13/284 342/107
2018/0074165 A1 * 3/2018 Martone ................. G01S 7/023
2022/0120886 A1 * 4/2022 Rao ......................... G01S 13/34
2023/0118317 A1 * 4/2023 Melzer .................... G01S 13/50 375/346
2024/0183935 A1 * 6/2024 Zhang ..................... G01S 7/006

OTHER PUBLICATIONS

"Extended European Search Report for European Patent Application No. 23168601.5", Mailed Date: Oct. 24, 2023, 8 pages.

* cited by examiner

*Primary Examiner* — William Kelleher
*Assistant Examiner* — Kenneth W Good
(74) *Attorney, Agent, or Firm* — CANTOR COLBURN LLP

(57) ABSTRACT

A radar system is configured to transmit via transmit antenna a digitally modulated carrier signal in successive transmission frames using different frequency subbands for each transmission frame, such that contiguous transmission frames do not use the same frequency subband. A receive antenna is configured to receive a radar return signal reflected by a target on a frequency subband used by the transmit antenna in the immediately preceding transmission frame so that the transmit antenna and the receive antenna use different subbands in a given transmission frame.

20 Claims, 10 Drawing Sheets

800
T1
T2
f1
f1
f1
f2
f2
f2
f3
f3
f3
f4
f4
f4
TIME
FREQUENCY

900
T1
T2
f1
f1
f1
f2
f2
f2
f3
f3
f3
f4
f4
f4
TIME
FREQUENCY

DIGITAL MODULATOR RADAR TRANSMITTER LEAKAGE CANCELLATION USING FREQUENCY TEMPORAL FILTERING

BACKGROUND

Transmitter leakage and receiver saturation are known to affect the performance of digital radar systems. Transmitter leakage refers to unwanted signal that leaks from the transmitter and interferes with the receiver, causing errors in a signal reflected by a target object and received by the receiver. Transmitter leakage can be caused by flaws in the transmitter design, the presence of harmonic signals that are not filtered properly, coupling between the transmitter and receiver such as can occur in a shared antenna system, etc.

Receiver saturation can occur when a received signal is too strong for the receiver to handle, which can lead to distortion or a complete loss of the signal. Receiver saturation can also occur when the radar system is operating at close range (e.g., when a target is very close to the radar system) or when the target is very large, reflecting a lot of energy back to the receiver. Moreover, if the receiver is designed with limited dynamic range or gain, it may be unable to handle large amounts of incoming signal.

It is therefore desirable to reduce transmitter leakage and receiver saturation in conventional radar systems. However, conventional approaches for reducing transmitter leakage and receiver saturation both increase the cost of the system and/or reduce system efficiency.

SUMMARY

The following is a brief summary of subject matter that is described in greater detail herein. This summary is not intended to be limiting as to the scope of the claims.

Described herein are various technologies relating to transmission leakage cancelation. With more particularity, various technologies described herein facilitate reducing and/or canceling transmitter leakage and the receiver saturation caused thereby. In one embodiment, frequency diversity is maintained between the transmitter and the receiver within respective transmission frames by dividing a total amount of transmission bandwidth allocated to the radar system into smaller subbands. The transmitter transmits on a first frequency subband in a first transmission frame then switches to a second frequency subband for the second transmission frame. The receiver begins to receive during the second transmission frame and uses the first frequency subband that the transmitter is no longer using. In the third transmission frame, the transmitter switches to a third frequency subband, and the receiver switches to the second frequency subband that the transmitter is no longer using. This continues until all N frequency subbands have been used by the transmitter at which point the transmitter switches back to the first subband while the receiver receives on the last (Nth) subband in the set, and the process is iteratively repeated.

In another embodiment, the transmitter randomly selects subbands from the set of N subbands with the condition that the transmitter may not use the same subband in contiguous time frames; i.e., the transmitter is not permitted to use the same subband in back-to-back transmission frames. During a given transmission frame, the receiver uses the frequency subband that was used by the transmitter in the immediately preceding transmission frame. Since the transmitter is constrained to use a different subband in each transmission frame, and since the receiver is constrained to use the transmitter subband of the previous transmission frame, frequency diversity is established between the transmitter and receiver such that they do not use the same subband in the same transmission frame; i.e., with regard to subband allocation between the transmitter and the receiver, the receiver lags behind the transmitter by 1 transmission frame.

In another embodiment, the receiver is provided with information regarding the transmitter's subband sequence and therefore knows which subband will be used by the transmitter. In this case, the receiver can 1) select a different subband, or 2) generate or be provided with a subband sequence that lags the transmitter by 1 subband (when the subbands are in an ordered sequence).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
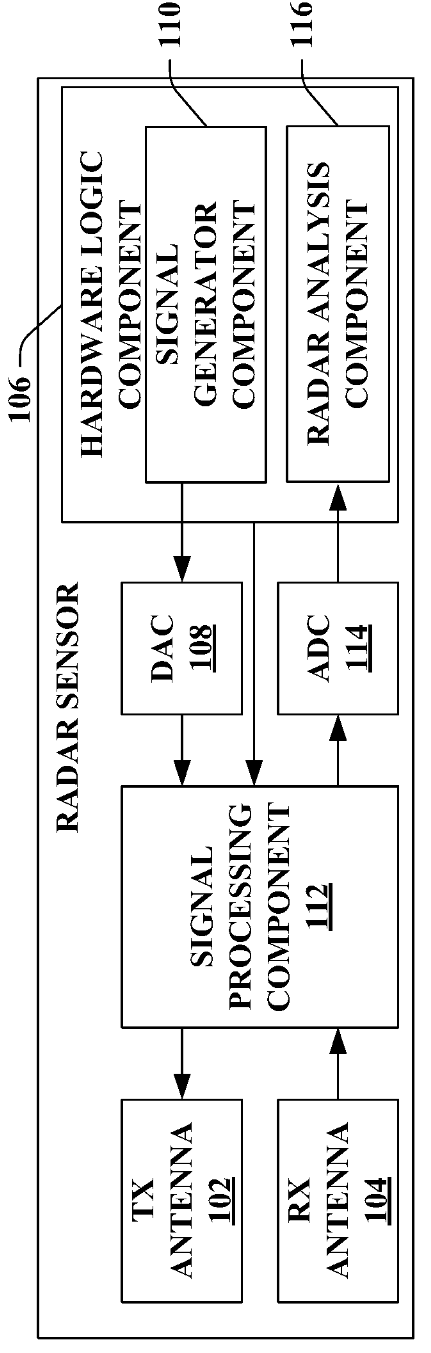
FIG. 1 is a functional block diagram of an exemplary radar sensor.

Various technologies pertaining to a digitally modulated radar system with improved transmitter leakage cancelation (relative to conventional digitally modulated radar systems) are described herein. With more particularity, technologies described herein relate to transmitting in a first frequency subband and then switching the transmitter to a second frequency subband while the receiver receives reflected signal in the first frequency subband. That is, the transmitter transmits on a given subband during a given time frame while the receiver receives on the subband used by the transmitter in the immediately preceding time frame. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With regard to the problems solved by the aspects disclosed herein, it is known that transmitter leakage is caused by insufficient isolation between a transmitter path and a receiver path. It is also known that transmitter leakage can seriously impair the performance of the receiver. Therefore, it becomes desirable to increase the isolation between the transmitter and receiver.

In digitally modulated radars (e.g., phase-modulated continuous wave (PMCW), frequency division multiplexing (OFDM), frequency shift keying (FSK), time shift keying (TSK), phase shift key (PSK), etc.), the leakage of the transmitter signal into the receiver and/or strong reflections in the near field tend to saturate the receiver path. Existing digitally modulated radars implement one of the following strategies to combat transmitter leakage: 1) employing expensive leakage cancellation techniques, which increase the complexity and cost of the system; 2) implementing highly linear receivers with amplifiers having a relatively high dynamic range, thereby increasing the power consumption and the cost of the system; and 3) turning off the receiver during transmitter activity, thereby reducing the amount of energy that can be focused on the targets. As can be seen, these conventional approaches all have drawbacks including increasing system complexity, cost, and power consumption and detrimentally affecting system performance.

The features described herein relate to systems and methods that achieve better performance in digitally modulated stepped radar systems (compared to conventional radar systems) by mitigating saturation in the receiver channel when the radar system is in continuous transmission mode. The different frequency-time intervals of the digitally stepped modulation provide for frequency/temporal filtering to attenuate different time delays received in the system, enabling cancelation of the transmitter leakage. The described reduction in transmitter leakage and receiver saturation is achieved by a combination of features, including but not limited to: splitting the radar bandwidth into smaller subbands; transmitting each subband in a different time frame; ensuring that the working band of the receiver and the transmitter are not the same in a given time frame; and implementing a receiver configured to select which subband can be received. For instance, the transmitter transmits on a first frequency subband in a first transmission frame, and then in a second transmission frame, the receiver receives on the first frequency subband while the transmitter transmits on a second frequency subband, and so forth such that the receiver is always receiving on a frequency subband that was used by the transmitter to transmit in an immediately preceding transmission frame. In this manner, the receiver duty cycle can be maintained at 100%.

With reference now to FIG. 1, an exemplary radar sensor (also referred to as a radar system) 100 is illustrated, in which various features, circuits, etc. described herein can be employed. The radar sensor 100 includes a transmit antenna 102, a receive antenna 104, and a hardware logic component 106. Briefly, the hardware logic component 106 is configured to prepare radar signals that are transmitted by the transmit antenna 102, and to compute target solutions indicating estimated positions and/or velocities of objects based upon radar returns received by the receive antenna 104. In exemplary embodiments, various components of the radar sensor 100 can be integrated as a same system-on-a-chip (SoC). In various embodiments, the radar sensor 100 can be employed on a vehicle, such as a land vehicle, an aircraft, to identify positions and velocities of objects in the operational environment of the vehicle.

The radar sensor 100 further comprises one or more DACs 108. The hardware logic component 106 comprises a signal generator component 110 that prepares radar signals for transmission by way of the transmit antenna 102. The signal generator component 110 is configured to control the DAC 108 to cause the DAC 108 to generate an analog radar signal for transmission by the transmit antenna 102. In other words, the signal generator component 110 generates digital values that, when received by the DAC 108, cause the DAC 108 to output an analog radar signal having various desired signal characteristics. Hence, the radar sensor 100 is configured as a digitally modulated radar sensor, wherein characteristics of radar signals output by the transmit antenna 102 are digitally controlled by the signal generator component 110 of the hardware logic component 106. For example, the signal generator component 110 can be configured to control the DAC 108 such that the radar sensor operates as a PMCW radar sensor.

The radar sensor 100 further includes an analog signal processing component 112. The signal processing component 112 is generally configured to perform various analog signal processing operations on analog signals that are to be output by the transmit antenna 102 and/or that are received by the receive antenna 104. By way of example, and not limitation, the signal processing component 112 can amplify a radar signal output by the DAC 108 to increase the power of the radar signal prior to transmission by way of the transmit antenna 102. In a further example, the signal processing component 112 can be configured to mix a radar signal output by the DAC 108 with a carrier signal to shift a center frequency of the radar signal. The signal processing component 112 can include any of various components that are configured to perform these various functions. For example, the signal processing component 112 can include mixers, amplifiers, filters, or the like. Functionality of the signal processing component 112 and its constituent components can be controlled by the hardware logic component 106. The transmit antenna 102 receives processed radar signals from the signal processing component 112 and emits the radar signals into an operational environment of the radar sensor 100.

The receive antenna 104 receives radar returns from the operational environment. In exemplary embodiments, the radar returns received by the receive antenna 104 comprise reflections, from objects in the operational environment of the sensor 100, of radar signals emitted by the transmit antenna 102. It is to be understood that the radar returns received by the receive antenna 104 can further include reflections of radar signals emitted by other radar emitters that are active within the operational environment of the radar sensor 100. As will be described in greater detail below, the technologies described herein can reduce transmitter leakage and receiver saturation by hopping between frequency subbands used for transmission and receiving. Responsive to receipt of radar returns from the operational environment of the sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The signal processing component 112 receives a radar signal from the receive antenna 104. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform various of these signal processing operations (e.g., mixing) based further upon a radar signal transmitted by the transmit antenna 102.

The radar sensor 100 further comprises one or more ADCs 114 that receives a processed radar signal from the signal processing component 112. The ADC 114 digitally samples the radar signal and outputs digital values that are indicative of amplitude of the radar signal over time. These digital values are collectively referred to herein as radar data. The radar data output by the ADC 114 are indicative of the radar returns received by the receive antenna 104.

The hardware logic component 106 receives the radar data from the ADC 114. The hardware logic component 106 further comprises a radar analysis component 116. The radar analysis component 116 is configured to compute positions and/or velocities of targets in the operational environment of the radar sensor 100 based upon the radar data. In a non-limiting example, the radar analysis component 116 can compute a range, a bearing, and/or a velocity of a target in the operational environment of the sensor 100 based upon the radar data.

Figure 2:
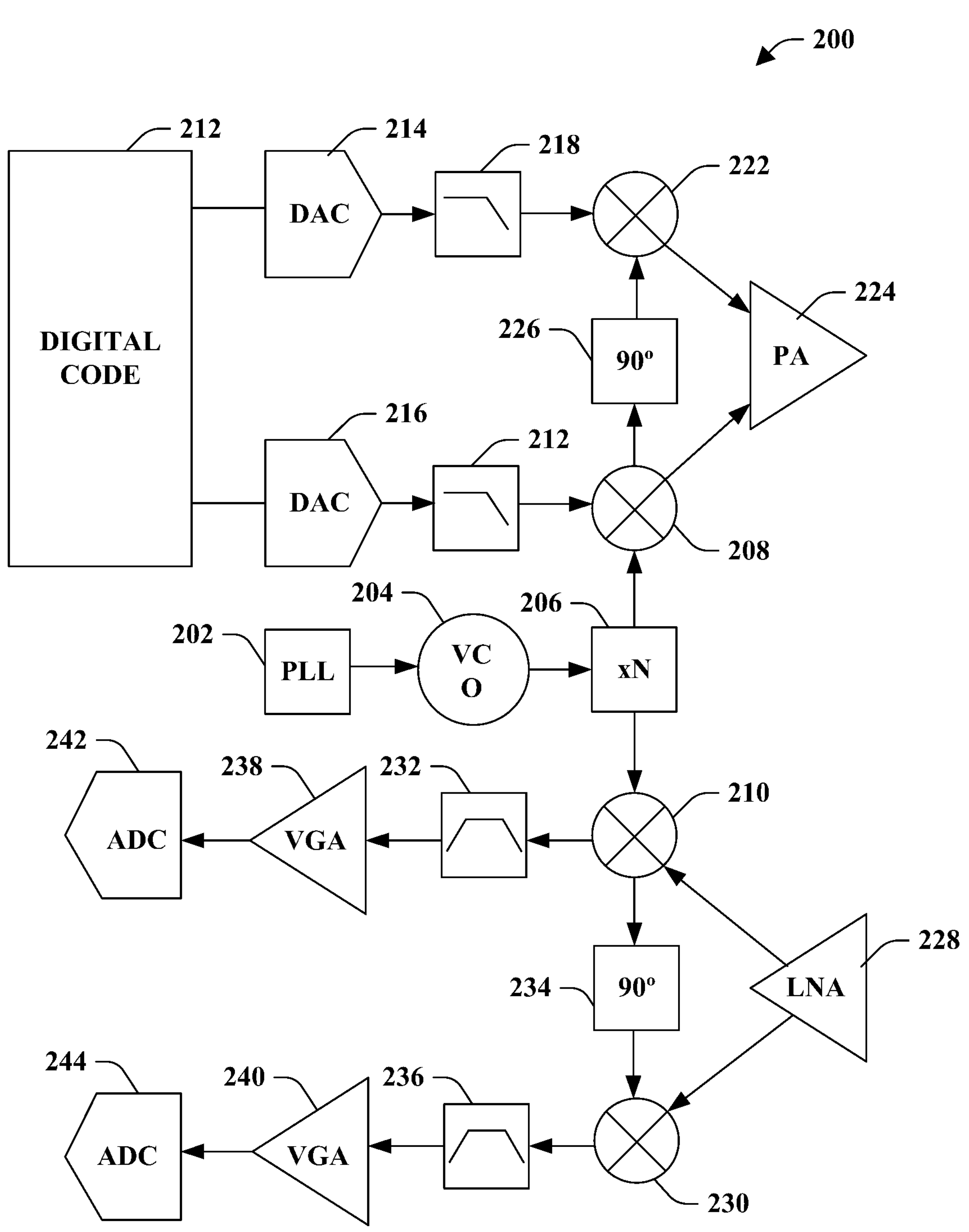
FIG. 2 illustrates a transceiver circuit with reduced transmitter leakage.

With reference now to FIG. 2, a transceiver circuit 200 (also referred to herein as a "hardware logic component" or simply "hardware logic") with reduced transmitter leakage is illustrated, in accordance with one or more features described herein. The circuit comprises a phase locked loop (PLL) component 202 and a voltage-controlled oscillator (VCO) 204 that cooperate to generate a carrier signal. The carrier signal can be multiplied in frequency. In another embodiment the carrier signal is not multiplied in frequency. The carrier signal is provided to an incrementor component 206 that multiplies the carrier frequency by N, where N increases from 1 to k subbands during transmission, to provide a frequency offset from one transmission frame to the next transmission frame. The incremented carrier signal is then provided to a first transmitter combiner component 208 and a first receiver combiner component 210.

The transmitter portion of the circuit comprises digital code 212 that is provided to digital-to-analog (DAC) converters 214, 216, each of which generates a baseband signal with an offset frequency (e.g., equivalent to the bandwidth of the subband to be used for transmission). The baseband signal is used to modulate the carrier before it is transmitted. Each DAC 214, 216 passes its modulated carrier to a respective low pass filter (LPF) 218, 220 which attenuates higher frequencies of the modulated carrier signal. The filtered modulated carriers are then provided to respective transmitter combiner components 208, 222.

The first transmitter combiner component 208 combines the incremented carrier signal received from the incrementor component 206 with the frequency offset received from the low pass filter 220 to modulate the carrier signal. The modulated carrier signal is then provided to a power amplifier 224 for transmission and to a transmitter phase shift component 226 that shifts the phase of the modulated carrier by 90°. The modulated carrier signal with the 90° phase shift is then provided to the second transmitter combiner component 222, where it is combined with the frequency offset received from the lowpass filter 218 to produce a modulated phase-shifted carrier signal. The modulated phase-shifted carrier signal is then provided to the power amplifier 224 for transmission with the unshifted modulated carrier signal from the first transmitter combiner component 208.

The receiver side of the circuit comprises a low noise amplifier (LNA) 228 that amplifies a received signal and provides the amplified signal to each of the first receiver combiner component 210 and a second receiver combiner component 230. The first receiver combiner component 210 combines the incremented carrier signal received from the incrementor component 206 with the amplified signal from the LNA 228 to produce a down-converted version of the received signal. the down-converted signal is then provided to a first receiver bandpass filter 232 (or low pass filter, not shown) as well as to a receiver phase shift component 234 that shifts the phase of the down-converted signal by 90°. The phase shifted down-converted signal is provided to the second receiver combiner component 230 where it is combined with the amplified received signal from the LNA 228. The combined phase-shifted signal is then provided by the second receiver combiner component 230 to a second receiver bandpass filter 236 (or low pass filter, not shown).

The first receiver bandpass filter 232 produces a filtered version of the down-converted signal received from the first receiver combiner component 210 and provides the filtered signal to a first receiver variable gain amplifier (VGA) 238. The second receiver bandpass filter 236 produces a filtered version of the phase shifted combined signal received from the second receiver combiner component 230 and provides a filtered signal to a second receiver VGA 240. The VGAs 238, 240 amplify the filtered signals received from their respective receiver bandpass filters 232 236. VGA 238 sends an amplified signal to an analog-to-digital converter (ADC) 242, and VGA 240 sends an amplified signal to ADC 244. Received signals are sampled at the ADCs 242, 244 for further processing in subsequent stages.

During operation of the transceiver circuit 200, each subband is transmitted in a different time frame. The subband of the receiver is the same as the subband transmitted by the transmitter in the previous time frame. Since the transmitter and the receiver are working in different frequency bands at the same time, the leakage from the transmitter to the receiver is mitigated.

Figure 3:
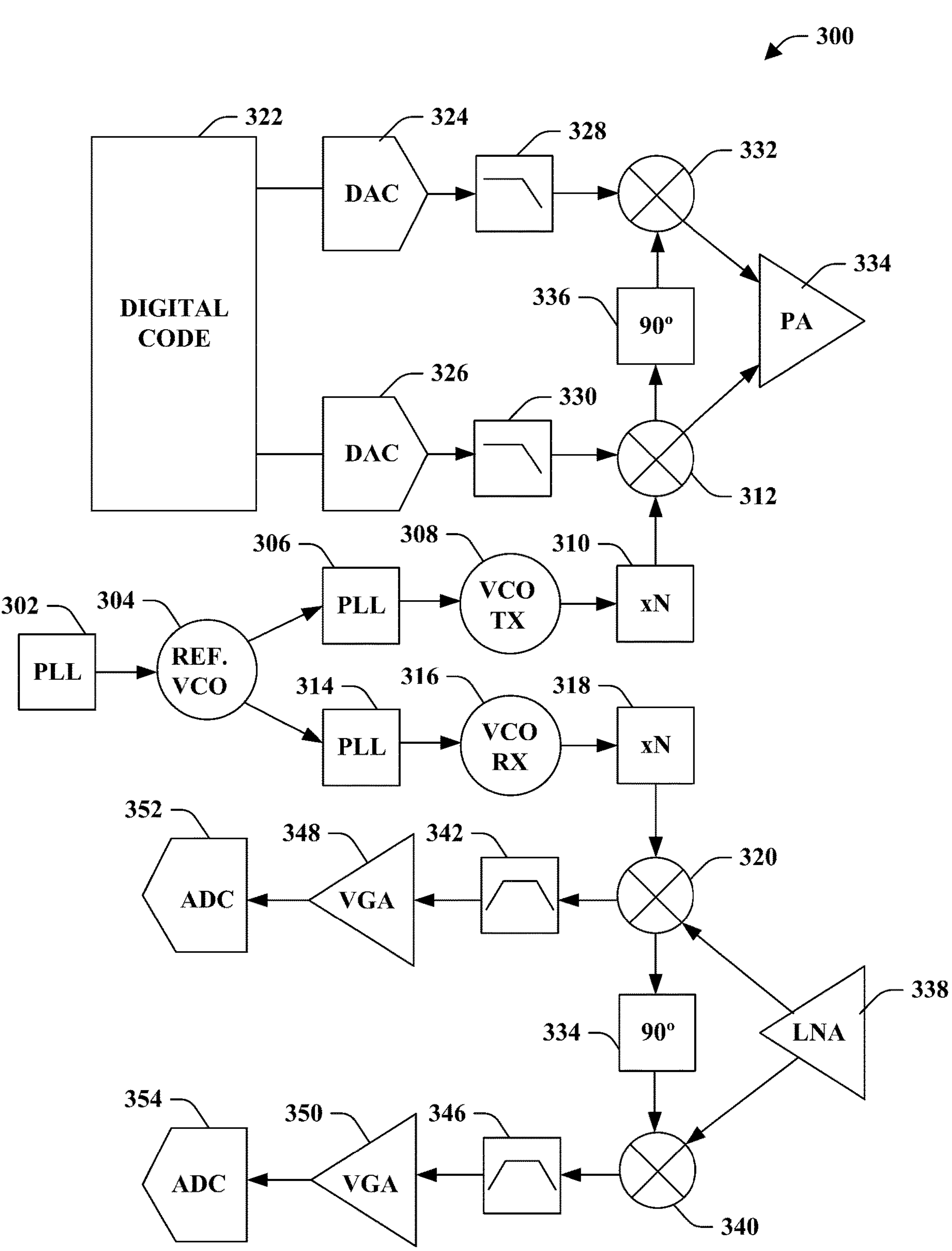
FIG. 3 illustrates a transceiver circuit with reduced transmitter leakage comprising separate transmitter and receiver voltage-controlled oscillators (VCOs).

Turning now to FIG. 3, a transceiver circuit 300 (also referred to herein as a "hardware logic component" or simply "hardware logic") with reduced transmitter leakage comprising separate transmitter and receiver VCOs is illustrated, in accordance with one or more aspects described herein. In the illustrated embodiment, two different carrier signals are generated (VCO TX, and VCO RX), one for the transmitter and one for the receiver. There is an offset frequency between both carriers equivalent to N times the bandwidth of the subband to be used. The circuit comprises a first phase locked loop (PLL) component 302 and a reference voltage-controlled oscillator (VCO) 304 that cooperate to generate a reference carrier signal. The carrier signal can be multiplied in frequency. In another embodiment the carrier signal is not multiplied in frequency. The reference carrier signal is provided to a transmitter PLL 306, which cooperates with a transmitter VCO (VCO TX) 308 to generate a transmitter-side carrier signal.

The transmitter-side carrier signal is provided to an incrementor component 310 that multiplies the carrier frequency by N, where N increases from 1 to k subbands during transmission, to provide a frequency offset from one transmission frame to the next transmission frame. The incremented carrier signal is then provided to a first transmitter combiner component 312.

The reference carrier signal is also provided to a receiver PLL 314 which cooperates with a receiver VCO (VCO RX) 316 to generate a receiver-side carrier signal. The receiver-side carrier signal is provided to a receiver incrementor component 318 that increments the carrier frequency by N, where N increases from 1 to k subbands during transmission, to provide a frequency offset from one transmission frame to the next transmission frame. The incremented carrier signal is then provided to a first receiver combiner component 320.

The transmitter portion of the circuit comprises digital code 322 that is provided to digital-to-analog (DAC) converters 324, 326, each of which generates a baseband signal with an offset frequency (e.g., equivalent to the bandwidth of the subband to be used for transmission). The baseband signal is used to modulate the carrier before it is transmitted. Each DAC 324, 326 passes its modulated carrier to a respective low pass filter (LPF) 328, 330 which attenuates higher frequencies of the modulated carrier signal. The filtered modulated carriers are then provided to respective transmitter combiner components 312, 332.

The first transmitter combiner component 312 combines the incremented carrier signal received from the incrementor component 310 with the frequency offset received from the low pass filter 330 to modulate the carrier signal. The modulated carrier signal is then provided to a power amplifier 334 for transmission and to a transmitter phase shift component 336 that shifts the phase of the modulated carrier by 90°. The modulated carrier signal with the 90° phase shift is then provided to the second transmitter combiner component 332, where it is combined with the frequency offset received from the lowpass filter 328 to produce a modulated phase-shifted carrier signal. The modulated phase-shifted carrier signal is then provided to the power amplifier 334 for transmission with the unshifted modulated carrier signal from the first transmitter combiner component to 312.

The receiver side of the circuit comprises a low noise amplifier (LNA) 338 that amplifies a received signal and provides the amplified signal to each of the first receiver combiner component 320 and a second receiver combiner component 340. The first receiver combiner component 320 combines the incremented carrier received from the incrementor component 318 with the amplified signal from the LNA 338 to produce a down-converted version of the amplified signal received from the LNA 338. The down-converted signal is then provided to a first receiver bandpass filter 342 (or low pass filter, not shown) as well as to a receiver phase shift component 344 that shifts the phase of the down-converted signal by 90°. The phase shifted down-converted signal is provided to the second receiver combiner component 340 where it is combined with the amplified received signal from the LNA 338. The combined phase-shifted signal is then provided by the second receiver combiner component 340 to a second receiver bandpass filter 346 (or low pass filter, not shown).

The first receiver bandpass filter 342 produces a filtered version of the down-converted signal received from the first receiver combiner component 320 and provides the filtered signal to a first receiver variable gain amplifier (VGA) 348. The second receiver bandpass filter 346 produces a filtered version of the phase shifted combined signal received from the second receiver combiner component 340 and provides a filtered signal to a second receiver VGA 350. The VGAs 348, 350 amplify the filtered signals received from their respective receiver bandpass filters 342, 346. VGA 348 sends an amplified signal to an analog-to-digital converter (ADC) 352, and VGA 350 sends an amplified signal to ADC 354. Received signals are sampled at the ADCs 352, 354 for further processing in subsequent stages.

During operation of the transceiver circuit 300 each subband is transmitted at a different time frame. The subband of the receiver is the same as the subband transmitted by the transmitter in the previous time frame. Since the transmitter and the receiver are working in different frequency bands at the same time, the leakage from the transmitter to the receiver is mitigated.

Figure 4:
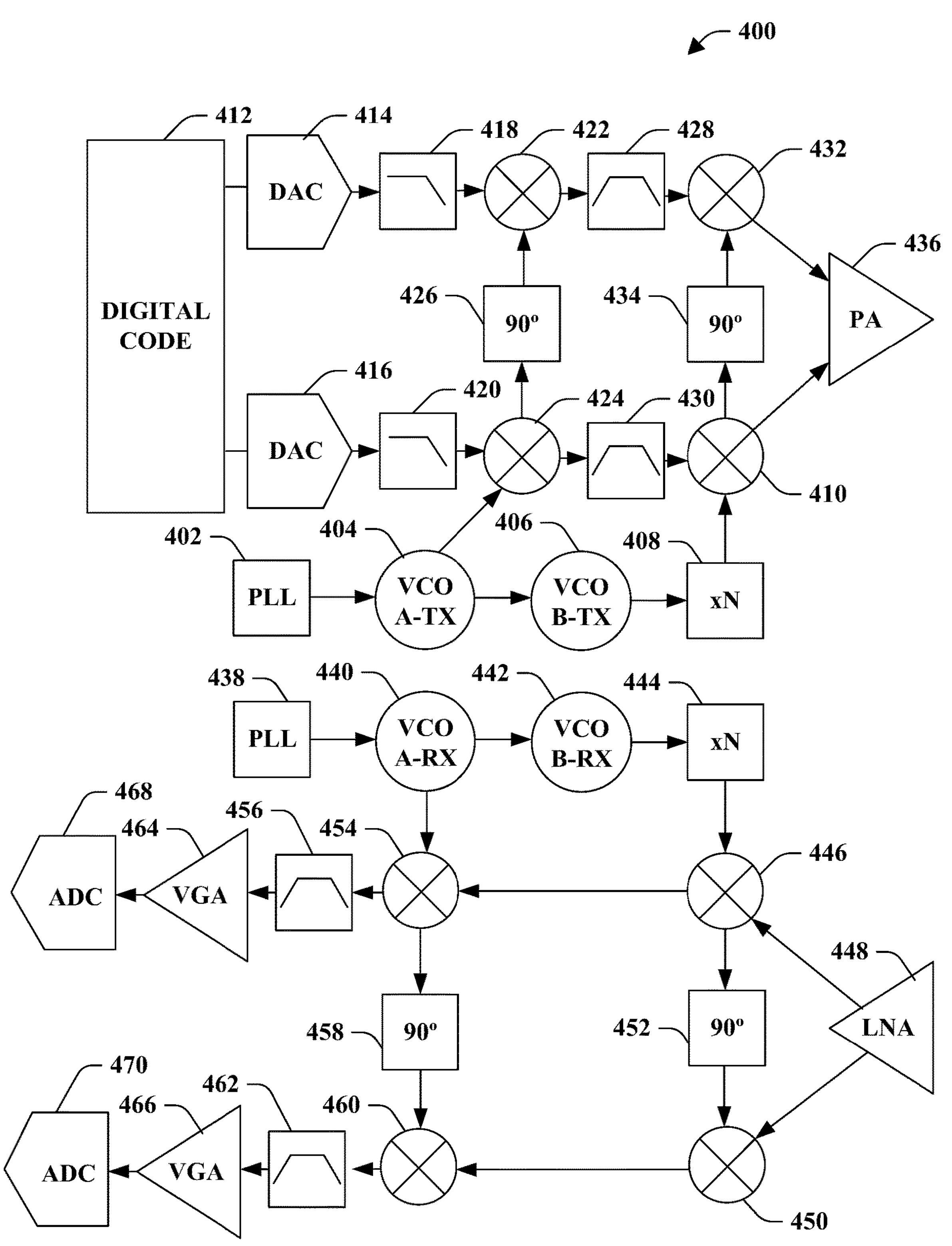
FIG. 4 illustrates a transceiver circuit with reduced transmitter leakage comprising separate dual VCOs for each of a transmitter portion and a receiver portion of the transceiver.

Turning now to FIG. 4, a transceiver circuit 400 (also referred to herein as a "hardware logic component" or simply "hardware logic") is illustrated, with reduced transmitter leakage comprising separate dual VCOs for each of a transmitter portion and their receiver portion of the transceiver, in accordance with one or more aspects described herein. In the illustrated superheterodyne architecture, the intermediate frequency of the receiver VCO A-RX differs from the intermediate frequency of the transmitter VCO A-TX, while the final carrier frequency of the transmitter VCO B-TX and the receiver VCO B-RX can be the same. Since the intermediate frequency of the receiver and the transmitter are different, the receiver and the transmitter work at different bands at the same time, reducing the leakage between the transmitter and the receiver. The working band of the receiver is set to be the same band used by the transmitter in the previous transmission frame.

The circuit comprises a transmitter-side phase locked loop (PLL) component 402 and a first VCO (VCO A-TX) 404 that cooperate to generate an intermediate carrier signal. The intermediate carrier signal is provided to a second transmitter-side VCO (VCO B-TX) 406 that generates a final transmitter-side carrier and provides it to an incrementor component 408, which multiplies the carrier frequency by N, where N increases from 1 to k subbands during transmission, to provide a frequency offset from one transmission frame to the next transmission frame. The incremented transmitter-side carrier signal is then provided to a first transmitter combiner component 410.

The transmitter portion of the circuit comprises digital code 412 that is provided to digital-to-analog (DAC) converters 414, 416, each of which generates a baseband signal with an offset frequency (e.g., equivalent to the bandwidth of the subband to be used for transmission). The baseband signal is used to modulate the carrier before it is transmitted. Each DAC 414, 416 passes its modulated carrier to a respective low pass filter (LPF) 418, 420 which attenuates higher frequencies of the modulated carrier signal. The filtered modulated carriers are then provided to respective second and third transmitter combiner components 422, 424. The third transmitter combiner component 424 combines the filtered signal received from the low pass filter 420 with the intermediate carrier signal generated by VCO A-TX 404. The combined signal is then provided to a first 90° phase shift component 426 that shifts the phase of the combined signal by 90°. The phase shifted signal is provided to the second transmitter combiner component 422 where it is combined with the filtered signal received from the low pass filter 418.

The second transmitter combiner component 422 and the third transmitter combiner component 424 provide their combined signals to respective bandpass filters 428, 430 for filtering. Bandpass filter 428 provides its filtered signal to a fourth transmitter combiner component 432, while bandpass filter 430 provides its filtered signal to the first transmitter combiner component 410. The first transmitter combiner component 410 combines the filtered signal with the incremented signal received from the incrementor component 408 to produce a modulated signal and provides the modulated signal to a second 90° phase shift component 434 and to a power amplifier 436. The second 90° phase shift component 434 shifts the modulated signal received from the first transmitter combiner component 410 by 90° and provides the phase shifted modulated signal to the fourth transmitter combiner component, where it is combined with the filtered signal received from bandpass filter 428. The fourth transmitter combiner component then provides its combined signal to the power amplifier 436.

The receiver side of the circuit comprises a receiver-side phase locked loop (PLL) component 438 and a first receiver-side VCO (VCO A-RX) 440 that cooperate to generate an intermediate carrier signal. The intermediate carrier signal is provided to a second receiver-side VCO (VCO B-RX) 442 that generates a final receiver-side carrier and provides it to an incrementor component 444, which multiplies the carrier frequency by N, where N increases from 1 to k subbands during transmission, to provide a frequency offset from one transmission frame to the next transmission frame. The incremented receiver-side carrier signal is then provided to a first receiver combiner component 446.

The receiver side of the circuit also comprises a low noise amplifier (LNA) 448 that amplifies a received signal and provides the amplified signal to each of the first receiver combiner component 446 and a second receiver combiner component 450. The first receiver combiner component 446 combines the incremented carrier signal received from the incrementor component 444 with the amplified signal from the LNA 448 to produce a down-converted version of the amplified signal received from the LNA 448. The down-converted signal is then provided to a first receiver-side 90° phase shift component 452 and a third receiver combiner component 454. The phase shift component 452 shifts the phase of the down-converted signal by 90 degrees and provides the phase shifted signal to the second receiver combiner component 450 where it is used to down-convert the amplified signal received from the LNA 448.

The third receiver combiner component 454 combines the down-converted signal received from the first receiver combiner component 446 with the intermediate carrier signal generated by the VCO A-RX 440. The combined signal is provided to a first receiver bandpass filter 456 (or low pass filter, not shown) as well as to a second 90° receiver phase shift component 458 that shifts the phase of the down-converted signal by 90°. The phase shifted down-converted signal is provided to the fourth receiver combiner component 460, where it is combined with the down-converted signal from the second receiver combiner component 450. The combined signal is then provided by the second receiver combiner component 450 to a second receiver bandpass filter 462 (or low pass filter, not shown).

The first receiver bandpass filter 456 produces a filtered version of the combined signal received from the third receiver combiner component 454 and provides the filtered signal to a first receiver variable gain amplifier (VGA) 464. The second receiver bandpass filter 462 produces a filtered version of the phase shifted combined signal received from the fourth receiver combiner component 460 and provides a filtered signal to a second receiver VGA 466. The VGAs 464, 466 amplify the filtered signals received from their respective receiver bandpass filters 456, 462. VGA 464 sends an amplified signal to a first analog-to-digital converter (ADC) 468, and VGA 466 sends an amplified signal to a second ADC 470. Received signals are sampled at the ADCs 466, 470 for further processing in subsequent stages.

During operation of the transceiver circuit 400 each subband is transmitted at a different time frame. The subband of the receiver is the same as the subband transmitted by the transmitter in the previous time frame. Since the transmitter and the receiver are working in different frequency bands at the same time, the leakage from the transmitter to the receiver is mitigated.

Figure 5:
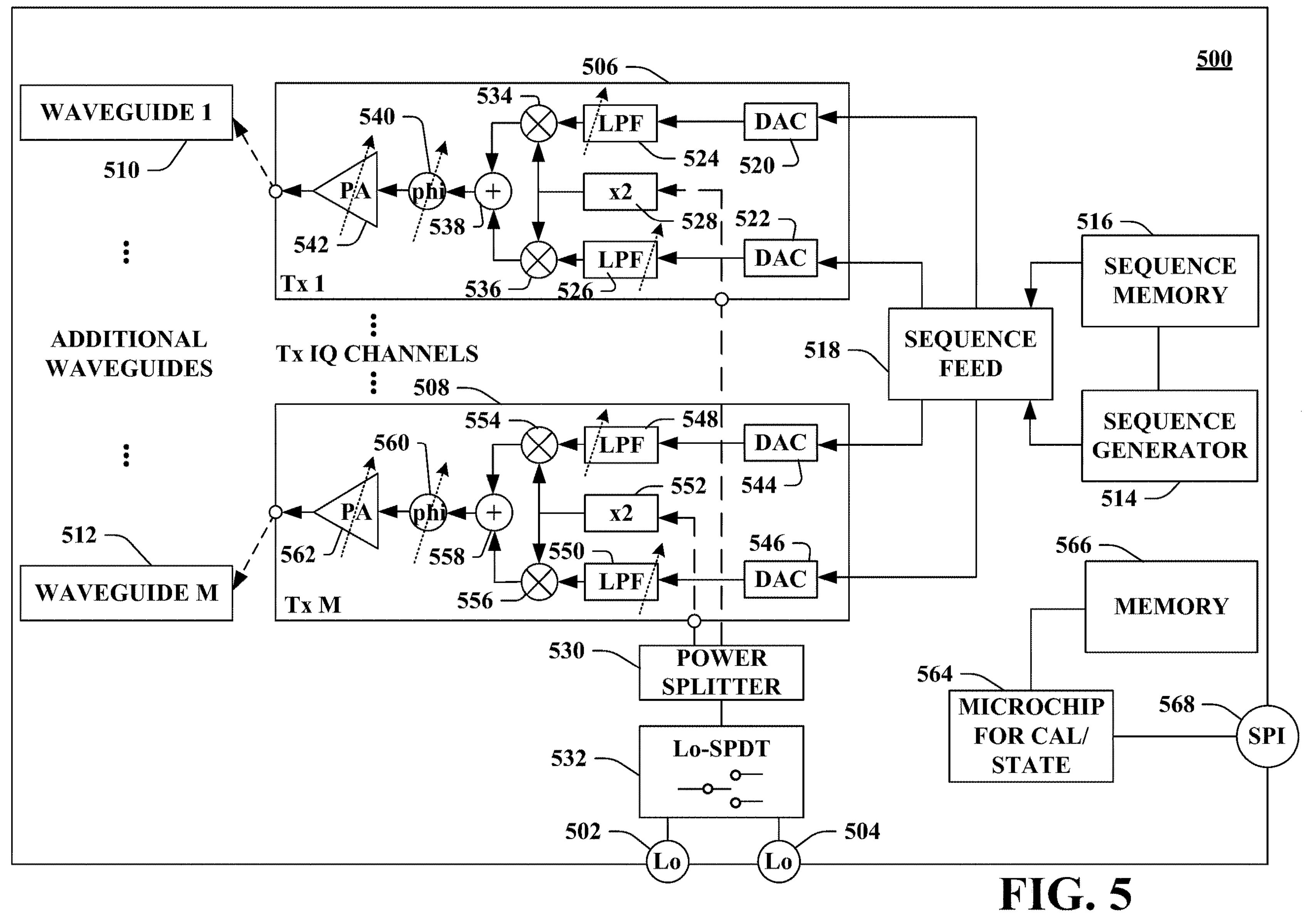
FIG. 5 illustrates a phase synchronization architecture wherein lower frequency oscillators synchronize the phase between transmitters and receivers.

With reference now to FIG. 5, a phase synchronization architecture 500 is illustrated, wherein local oscillators 502, 504 synchronize the phase between transmitters and receivers, in accordance with one or more features described herein. The architecture 500 can be deployed on, e.g., an 8-channel in-phase quadrature transmitter chip, or other suitable chip. Depicted are a first transmitter 506 and an Nth transmitter 508, with the understanding that the architecture 500 is not limited to only two transmitters but rather may have M transmitters where M is an integer. Each transmitter 1 to M transmits a signal to a respective waveguide 510, 512 1 to M. For the sake of brevity, only the first and Nth transmitters are illustrated. However, it will be understood that any number of additional transmitters and waveguides can be employed, as represented by the "additional Tx IQ channels" and the "additional waveguides" in FIG. 5. Also illustrated are a sequence generator 514 that generates sequences for transmission, a sequence memory 516 that stores sequences for transmission, and a sequence feed 518 configured to receive generated sequences directly from the sequence generator 514 and/or retrieve sequences from the sequence memory 516 for transmission. The sequence feed 518 provides sequences to the one or more transmitters 506, 508 for transmission to the one or more waveguides 512. More specifically, sequence feed 518 provides signal to each of a first digital to analog converter 520 and a second digital to analog converter 522 in the transmitter 506. The DACs 520, 522 convert the digital sequence received from the sequence feed 518 to analog signals which are then provided to respective lowpass filters 524, 526. An incrementor component 528 receives a signal from a power splitter 530. The power splitter 530 receives signals from the local oscillators 502, 504 via a switch 532 (EG, a single pole, double throw switch or some other suitable switch) that switches back and forth between the local oscillators 502, 504. The power splitter 530 provides signal to the incrementor component of each of the one or more transmitters.

The incrementor component 528 provides a signal to a first combiner component 534 and a second combiner component 536. The LPF 524 filters the signal received from the DAC 520 and the signal received from the incrementor component 528 and outputs a filtered signal to the first combiner component 534, which combines the filtered signal with the incremented signal received from the incrementor component 528. Similarly, the LPF 526 provides its filtered signal to the second combiner component 536, which combines the filtered signal with the incremented signal received from the incrementor component 528.

An aggregator component 538 is also provided which receives the signals from the first combiner component 534 and the second combiner component 536 and aggregates them into a single signal that is sent to a phase adjuster component 540 that adjusts the phase of the aggregated signal by a predetermined amount. The phase adjusted signal is provided to a power amplifier 542 that amplifiers the phase adjusted signal and transmits it to its respective waveguide.

In one embodiment, all transmitters in the architecture 500 comprise similar circuitry. Therefore, the Nth transmitter 508 similarly comprises a pair of DACs 544, 546, which receive digital signals from the sequence feed 518. Transmitter 508 also comprises a pair of LPFs 548, 550, an incrementor component 552, a pair of combiner components 554, 556, an aggregator component 558, and a phase shifter component 560, all of which operate in the manner described above with regard to the transmitter 506. Transmitter 508 further comprises a power amplifier 562 that ultimately transmits an amplified signal to waveguide N 512. In another embodiment the transmitters may comprise varied circuitry, as will be understood by one of ordinary skill in the art.

The architecture 500 further comprises a microchip 564 configure to, e.g., receive and/or transmit information related to calibration and/or state or status of the architecture 500, etc., which may be stored in memory 566. Also provided is a serial port interface (SPI) 568, via which information may be transmitted to and from the microchip 564.

Figure 6:
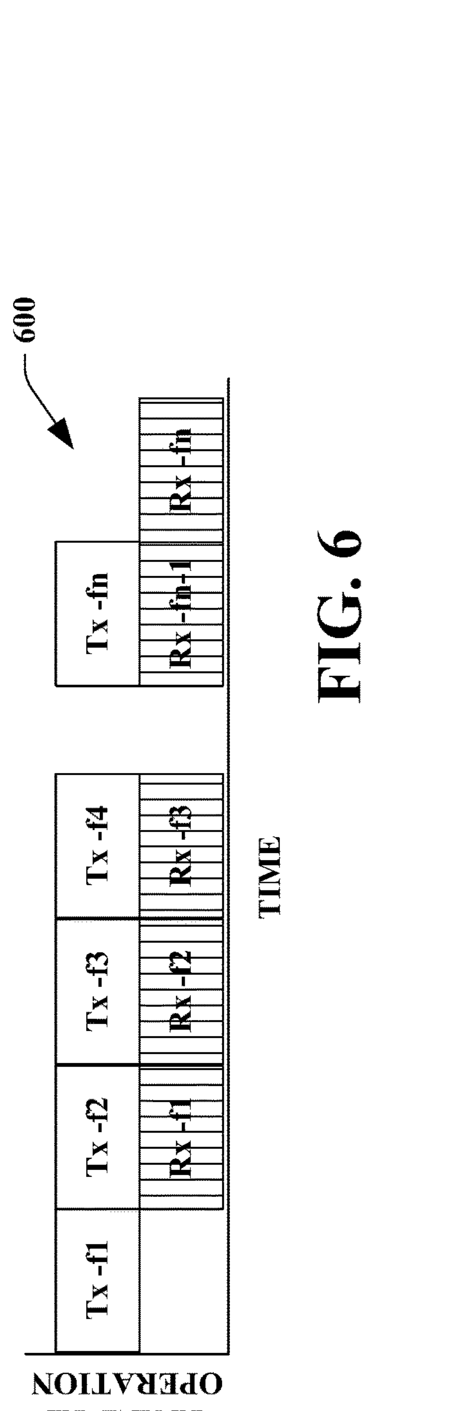
FIG. 6 is a graph of transmitter and receiver operation over time.

Referring now to FIG. 6, a graph 600 is illustrated showing transmitter and receiver operation over time, in accordance with one or more aspects described herein. In a first time frame, also called a transmission frame herein, the transmitter transmits on a first frequency subband, while the receiver is inactive during the first time frame. In the second time frame, the transmitter transmits on a second frequency subband while the receiver receives on the first frequency subband. In a third time frame, the transmitter transmits on a third frequency subband while the receiver receives on the second frequency subband, and so on. In this manner the receiver is always able to receive, on the correct frequency subband, a reflection of the signal transmitted in the previous time frame in that frequency subband. Put another way, in each time frame, the receiver is tuned to the frequency used by the transmitter in the immediately preceding time frame. Because the transmitter in each time frame is using a frequency subband different than the frequency subband used by the receiver in that time frame, transmitter leakage and receiver saturation are mitigated.

Figure 7:
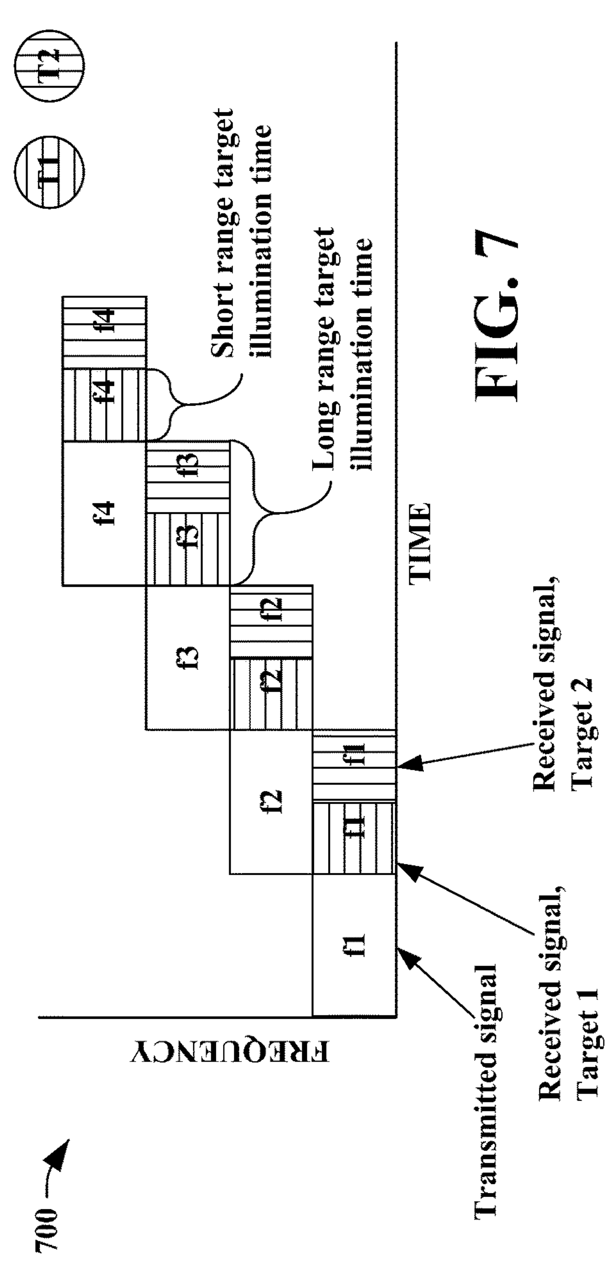
FIG. 7 is a graph that plots frequency against the time over five transmission frames.

Referring now to FIG. 7, a graph 700 is illustrated that plots frequency against the time over five transmission frames. In the first transmission frame, the transmitter transmits using the first frequency subband, f1. During the second transmission frame the transmitter transmits using a second frequency subband, f2. Meanwhile, during the second transmission frame the receiver receives signals in frequency subband f1 that have been reflected off of target objects. For instance, a first target may be closer to the transmitter than a second target so that the first target's reflected signal is received earlier during the second transmission frame then the second target's reflected signal. This is illustrated by the horizontal and vertical cross hatching on the receiver frequency subband f1 during the second transmission frame, and similarly on the receiver frequency subbands f2, f3, and f4 during the third, fourth, and fifth transmission frames, respectively. This is because long range target illumination time T2 spans the entire transmission frame while short range target illumination time T1 spans less than all of the transmission frame due to the transmitted signal being reflected back to the receiver sooner than the termination of the transmission frame.

Figures 8, 9:
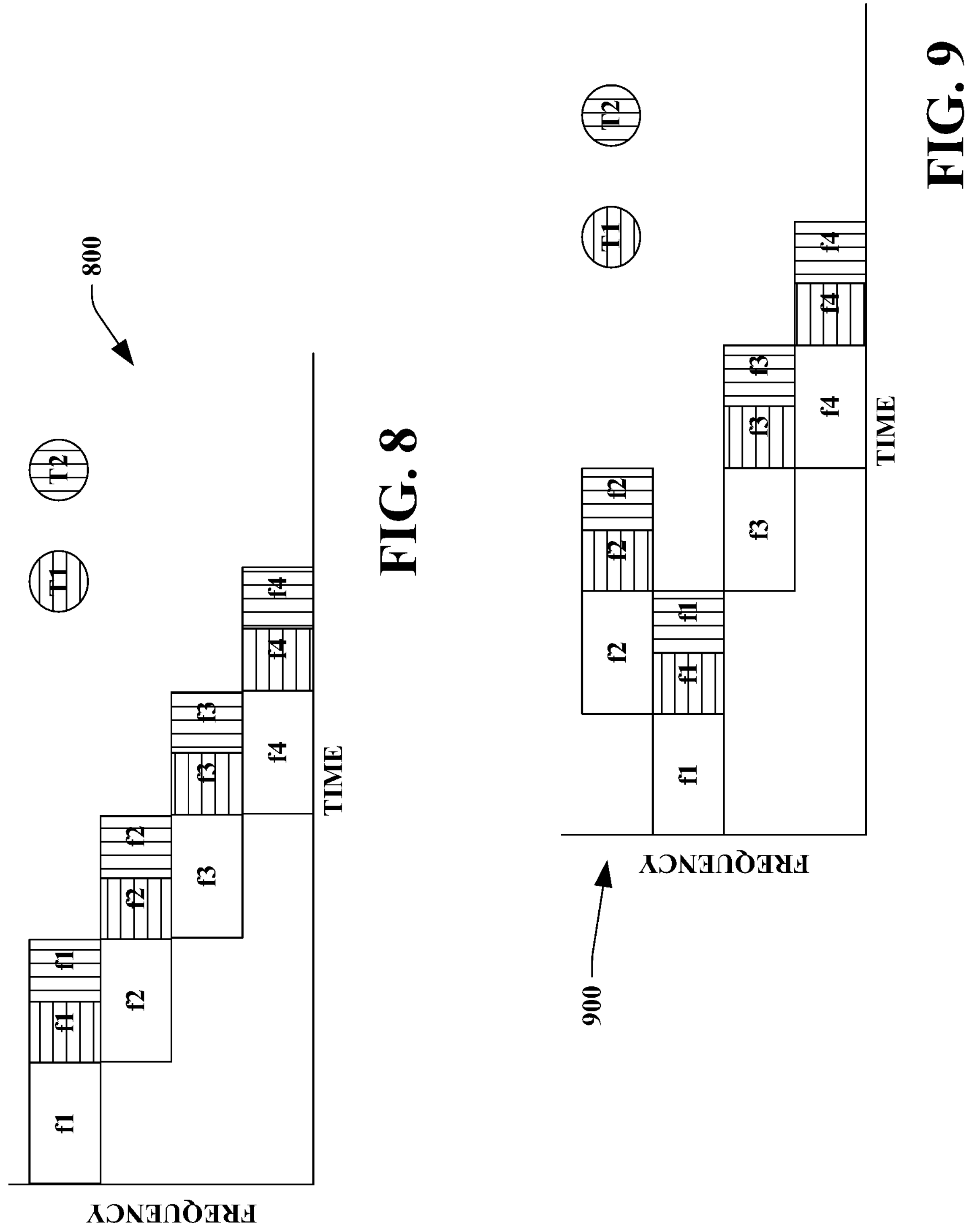
FIG. 8 is a graph showing another stepped arrangement of frequency subbands.
FIG. 9 is a graph showing a random arrangement of frequency subbands with respect to time.

Referring now to FIG. 8, a graph 800 is illustrated to show another stepped arrangement of frequency subbands, in accordance with one or more features described herein. While FIG. 7 shows the respective transmit and receive frequency subbands incrementally ascending over time, FIG. 8 shows an arrangement in which the transmit and receive frequency subbands incrementally descend for each transmission frame.

Referring now to FIG. 9, a graph 900 is illustrated to show a random arrangement of frequency subbands with respect to time. For example, in the illustrated arrangement, second frequency subband is higher than the first frequency subband, the third frequency is lower than the first and second frequency subbands, and the fourth frequency subband is lower than first, second, and third frequency subbands.

Figure 10:
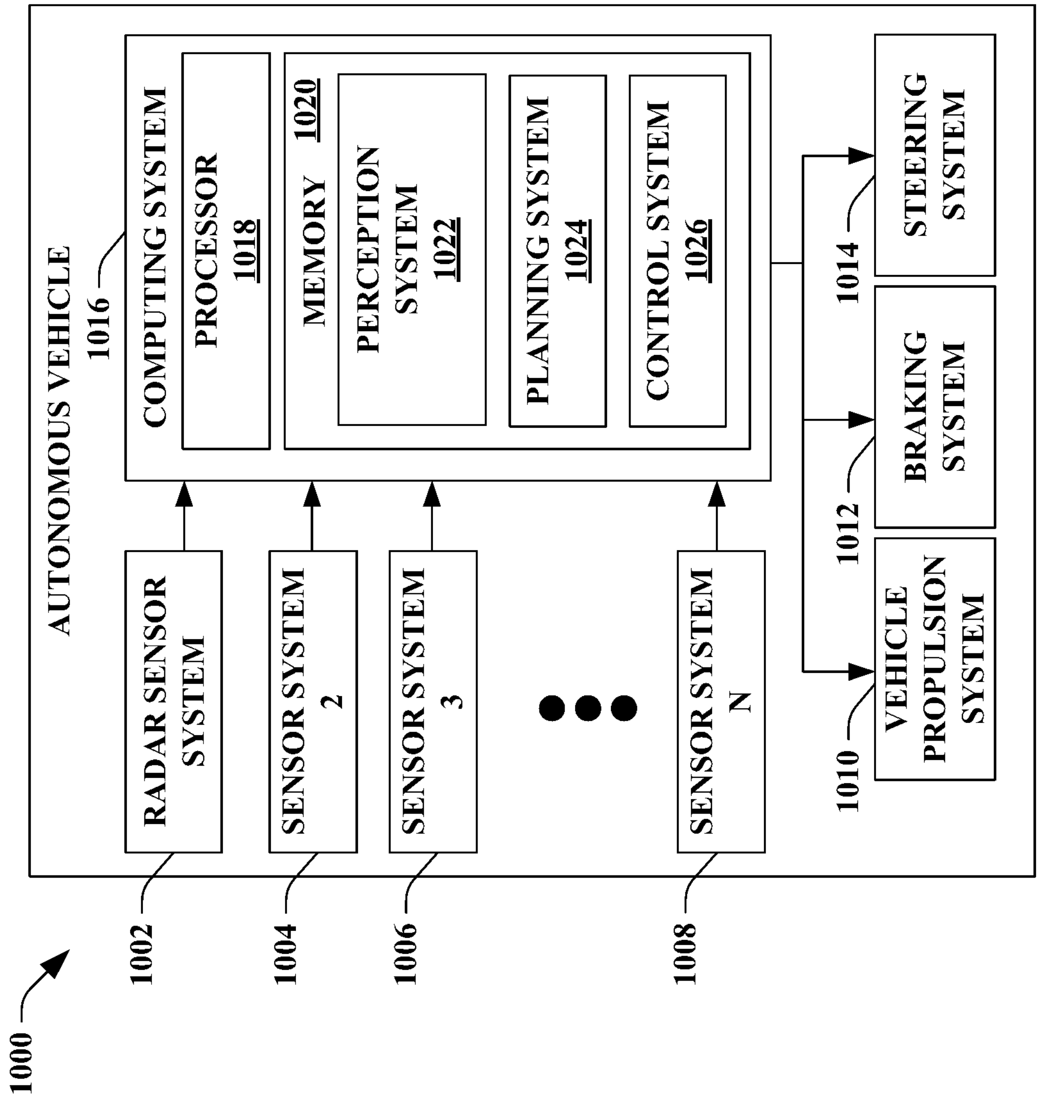
FIG. 10 is a functional block diagram of an exemplary AV.

Various technologies described herein are suitable for use in connection with an autonomous vehicle (AV) that employs a radar system to facilitate navigation about roadways. Referring now to FIG. 10, an exemplary AV 1000 is illustrated, wherein the AV 1000 can navigate about roadways without human conduction based upon sensor signals output by sensor systems of the AV 1000. The AV 1000 includes a plurality of sensor systems 1002-1008 (a first sensor system 1002 through an Nth sensor system 1008). The sensor systems 1002-1008 may be of different types. For example, the first sensor system 1002 is a radar sensor system, the second sensor system 1004 may be a lidar sensor system, the third sensor system 1006 may be a camera (image) system, and the Nth sensor system 1008 may be a sonar system. Other exemplary sensor systems include GPS sensor systems, inertial sensor systems, infrared sensor systems, and the like. The various sensor systems 1002-1008 are arranged about the AV 1000. The sensor systems 1002-1008 are configured to repeatedly (e.g., continuously, or periodically) output sensor data that is representative of objects and conditions in the driving environment of the AV 1000.

The AV 1000 further includes several mechanical systems that are used to effectuate appropriate motion of the AV 1000. For instance, the mechanical systems can include but are not limited to, a vehicle propulsion system 1010, a braking system 1012, and a steering system 1014. The vehicle propulsion system 1010 may be an electric engine, an internal combustion engine, or a combination thereof. The braking system 1012 can include an engine brake, brake pads, actuators, a regenerative braking system, and/or any other suitable componentry that is configured to assist in decelerating the AV 1000. The steering system 1014 includes suitable componentry that is configured to control the direction of movement of the AV 1000.

The AV 1000 additionally comprises a computing system 1016 that is in communication with the sensor systems 1002-1008 and is further in communication with the vehicle propulsion system 1010, the braking system 1012, and the steering system 1014. The computing system 1016 includes a processor 1018 and memory 1020 that includes computer-executable instructions that are executed by the processor 1018. In an example, the processor 1018 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 1020 comprises a perception system 1022, a planning system 1024, and a control system 1026. Briefly, the perception system 1022 is configured to identify the presence of objects and/or characteristics of objects in the driving environment of the AV 1000 based upon sensor data output by the sensor systems 1002-1008. The planning system 1024 is configured to plan a route and/or a maneuver of the AV 1000 based upon data pertaining to objects in the driving environment that are output by the perception system 1022. The control system 1026 is configured to control the mechanical systems 1010-1014 of the AV 1000 to effectuate appropriate motion to cause the AV 1000 to execute a maneuver planned by the planning system 1024.

The perception system 1022 is configured to identify objects in proximity to the AV 1000 that are captured in sensor signals output by the sensor systems 1002-1008. By way of example, the perception system 1022 can be configured to identify the presence of an object in the driving environment of the AV 1000 based upon images generated by a camera system included in the sensor systems 1004-1008. In another example, the perception system 1022 can be configured to determine a presence and position of an object based upon radar data output by the radar sensor system 1002. In exemplary embodiments, the radar sensor system 1002 can be or include the radar sensor 100. In such embodiments, the perception system 1022 can be configured to identify a position of an object in the driving environment of the AV 1000 based upon the estimated range output by the radar sensor 100.

The AV 1000 can be included in a fleet of AVs that are in communication with a common server computing system. In these embodiments, the server computing system can control the fleet of AVs such that radar sensor systems of AVs operating in a same driving environment (e.g., within line of sight of one another, or within a threshold distance of one another) employ different pulse sequence carrier frequencies. In an exemplary embodiment, a radar sensor system of a first AV can be controlled so as not to transmit pulse sequences having same center frequencies as pulse sequences transmitted by a radar sensor system of a second AV at the same time. In further embodiments, the radar sensor system of the first AV can be controlled to transmit pulse sequences in a different order than a radar sensor system of a second AV. For instance, the radar sensor system of the first AV can be configured to transmit a set of pulse sequences at four different center frequencies A, B, C, and D in an order A, B, C, D. The radar sensor system of the second AV can be configured to transmit pulse sequences using a same set of center frequencies in a frequency order B. A. D. C. Such configurations can mitigate the effects of interference when multiple AVs that employ radar sensor systems are operating in a same driving environment.

Figure 11:
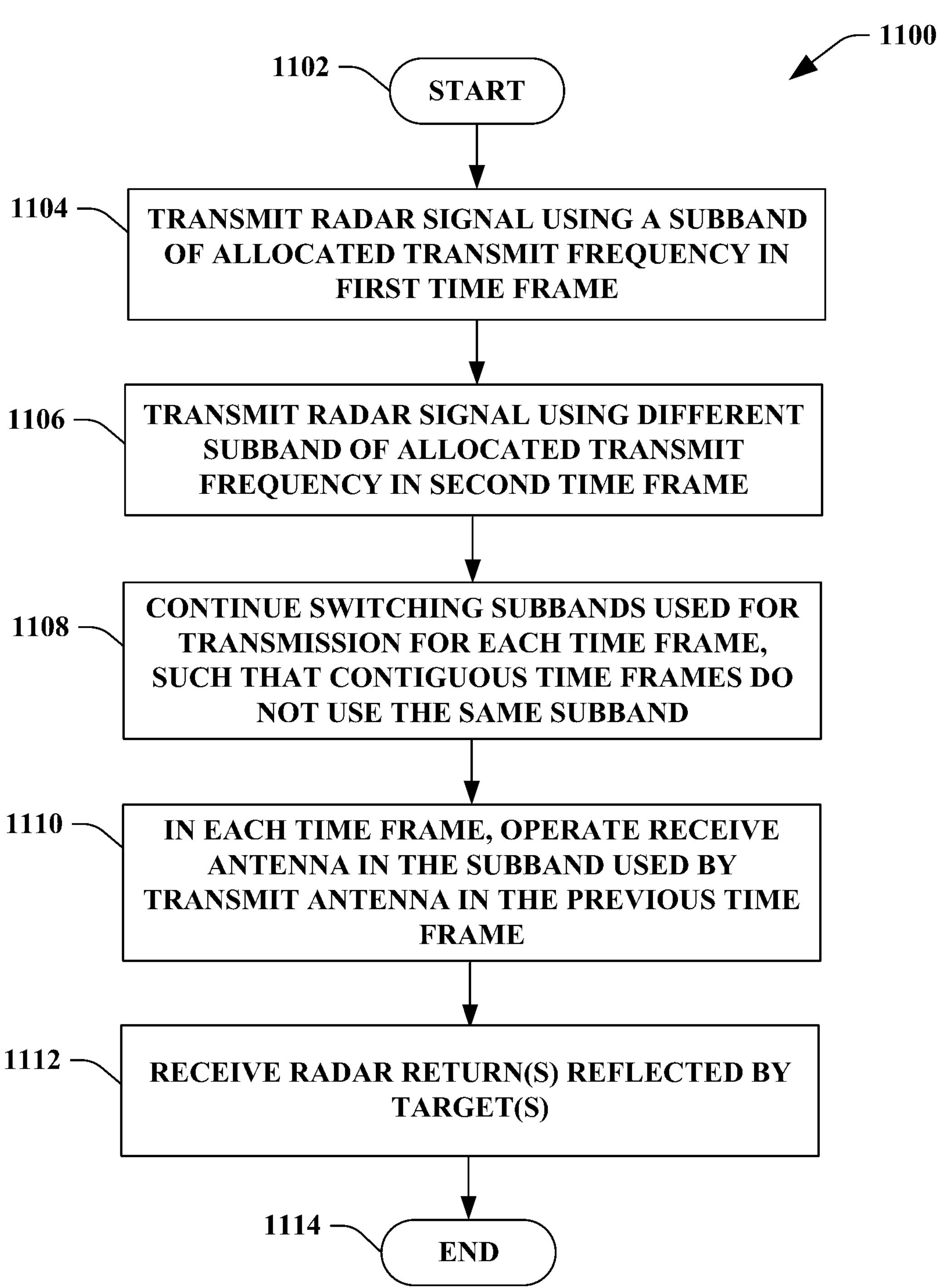
FIG. 11 illustrates a methodology that facilitates canceling transmitter leakage in digitally modulated radars.

FIG. 11 illustrates an exemplary methodology relating transmitter leakage cancelation in digitally modulated radars (e.g., PMCW, OFDM, FSK, TSK, PSK, etc.). While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 11, a methodology 1100 is illustrated that facilitates canceling transmitter leakage in digitally modulated radars. The methodology 1100 begins at 1102 and at 1104, a radar signal is transmitted from a transmit antenna toward a target using a frequency subband during a first transmission frame. At 1106, the radar signal is transmitted using a different frequency subband during a second transmission frame. At 1108, transmitter subband switching is continued for each successive time frame, such that contiguous time frames do not use the same frequency subband. At 1110, in each time frame, a receive antenna is operated using a frequency subband that was used by the transmit antenna in the immediately preceding time frame (See, e.g., FIG. 6). At 1112, radar return(s) reflected by one or more targets are received for processing and decoding. At 1114, the methodology terminates.

Acts 1104-1110 ensure that the transmitter antenna and the receive antenna do not use the same subband during any given time frame, thereby mitigating transmitter leakage and receiver saturation. Since the receiver uses the subband the transmitter just transmitted on in the preceding time frame, the receiver still receives the reflected signal in the current time frame, and since the transmitter has switched to a new subband, the receiver is not saturated by transmitter leakage.

In one embodiment, an allocated radar frequency band is divided into N frequency subbands, where N is at least two. In a non-limiting example, if 100 MHz of bandwidth is allocated for the radar system, it can be divided into, e.g., 10 subbands of 10 MHz each. Using the foregoing example, the transmitter can switch subbands each transmission frame, for instance by incrementally stepping up or down through the subbands, or randomly selecting a subband for the current transmission frame that is not the same as the subband used in the immediately preceding transmission frame. For instance, when stepping upward through the subbands, with subband 1 having the lowest frequencies and subband 10 having the highest, the transmitter uses subband 1 in time frame 1, subband 2 in time frame 2, etc., and subband 10 in time frame 10, and then starts over with subband 1 in time frame 11, subband 2 in time frame 12 . . . etc. A stepping down switching pattern would start with subband 10 in time frame 1 and step down to subband 1 in time frame 10, and then start over with subband 10 in time frame 11 on the next iteration, and so on.

It is also to be understood that the sequence of the subbands is not limited to being linear (e.g., 1-10 or 10-1), but rather can have any predetermined order (e.g., 3, 6, 5, 7, 8, 9, 4, 2, 10, 1, etc.) In another embodiment, subbands for each time frame are selected randomly, with the condition that contiguous time frames do not use the same subband (e.g., 3, 4, 7, 4, 3, 8, 2, . . . ).

Figure 12:
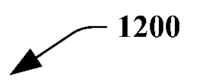
FIG. 12 is an exemplary computing system.
Figure 12:
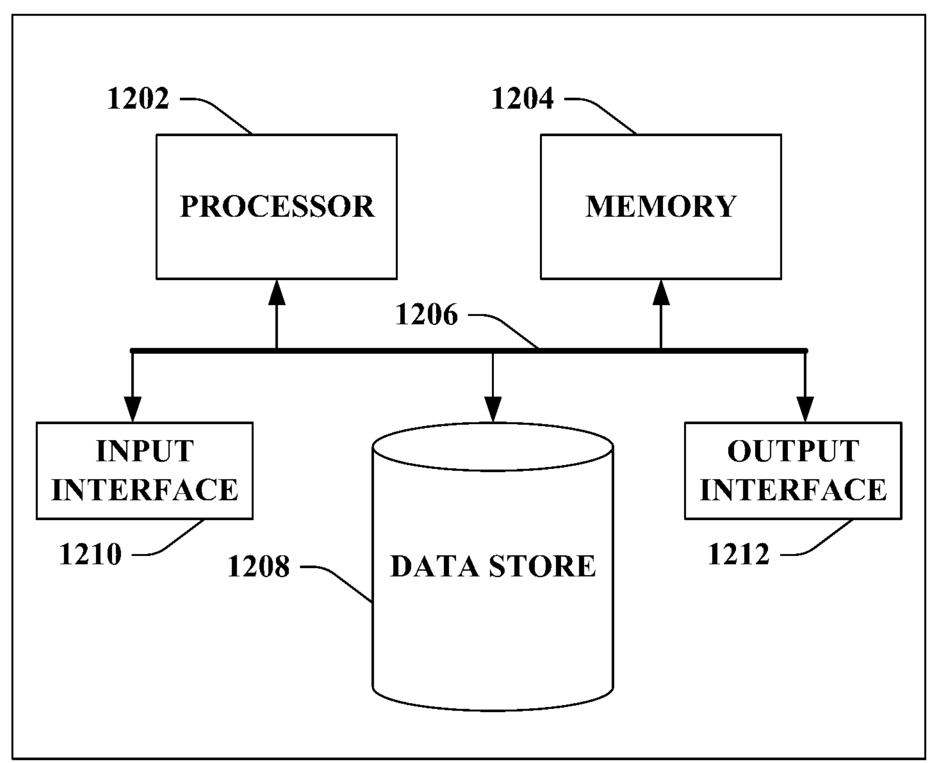

Referring now to FIG. 12, a high-level illustration of an exemplary computing device 1200 that can be used in accordance with the systems and methodologies disclosed herein is illustrated. For instance, the computing device 1200 may be or include the computing system 1016. The computing device 1200 includes at least one processor 1202 that executes instructions that are stored in a memory 1204. The instructions may be, for instance, instructions for implementing functionality described as being carried out by one or more modules, components, or systems discussed above or instructions for implementing one or more of the methods described above. The processor 1202 may be a GPU, a plurality of GPUs, a CPU, a plurality of CPUs, a multi-core processor, etc. The processor 1202 may access the memory 1204 by way of a system bus 1206. In addition to storing executable instructions, the memory 1204 may also store radar data, beamformed radar data, neural network configurations, etc.

The computing device 1200 additionally includes a data store 1208 that is accessible by the processor 1202 by way of the system bus 1206. The data store 1208 may include executable instructions, radar data, beamformed radar data, embeddings of these data in latent spaces, etc. The computing device 1200 also includes an input interface 1210 that allows external devices to communicate with the computing device 1200. For instance, the input interface 1210 may be used to receive instructions from an external computing device, etc. The computing device 1200 also includes an output interface 1212 that interfaces the computing device 1200 with one or more external devices. For example, the computing device 1200 may transmit control signals to the vehicle propulsion system 1010, the braking system 1012, and/or the steering system 1014 by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

Described herein are various technologies according to at least the following examples.

(A1) In an aspect, a method performed by a radar system is described herein. The method includes transmitting a radar signal from a transmit antenna toward a target using a first frequency subband during a first transmission frame. The method also includes transmitting the radar signal using a second frequency subband during a second transmission frame. The acts additionally includes continuing to switch subbands every transmission frame. The method further includes operating a receive antenna, during each transmission frame, in a frequency subband used by the transmit antenna in an immediately preceding transmission frame. The method also incudes receiving a radar return from the target at the receive antenna, the radar return based upon the radar signal reflecting from the target.

(A2) In some embodiments of the method of (A1), the method additionally includes dividing a radar frequency band into N frequency subbands, where N is at least two, where the transmitting further comprises using different frequency subbands in contiguous transmission frames.

(A3) In some embodiments of the method of (A2), the method also includes incrementally increasing the frequency subband used during each successive transmission frame until the Nth frequency subband is used, after which the transmit antenna resets to the first frequency subband for another iteration.

(A4) In some embodiments of the method of (A2), the transmit antenna is configured to incrementally decrease the frequency subband used during each successive transmission frame until the Nth frequency subband is used, after which the transmit antenna resets to the first frequency subband for another iteration.

(A5) In some embodiments of the method of (A2), the method further includes, for a given transmission frame, randomly selecting a frequency subband from among the N frequency subbands, wherein the randomly selected subband is different than a frequency band used in a transmission frame immediately preceding the given transmission frame.

(A6) In some embodiments of the method of at least one of (A1)-(A5), the radar system is configured for phase-modulated continuous wave (PMCW) operation.

(A7) In some embodiments of the method of at least one of (A1)-(A5), the radar system is configured for orthogonal frequency division multiplexing (OFDM) operation.

(B1) In another aspect, a radar system is configured to perform at least one of the methods disclosed herein (e.g., any of the methods of (A1)-(A7)).

(C1) In yet another aspect, a radar system includes a hardware logic component (e.g., circuitry), where the hardware logic component is configured to control elements of a radar system to perform at least one of the methods disclosed herein (e.g., any of the methods of (A1)-(A7)).

(D1) In still yet another aspect, a radar system includes a transmit antenna that transmits a radar signal toward a target. The transmit antenna is configured to: 1) transmit the radar signal using a first frequency subband during a first transmission frame; 2) transmit the radar signal using a second frequency subband during a second transmission frame; and 3) continue to switch subbands every transmission frame. The radar system also includes a receive antenna that receives a radar return from the target, the radar return based upon the radar signal reflecting from the target. The receive antenna is configured to operate, during each transmission frame, in a frequency subband used by the transmit antenna in an immediately preceding transmission frame.

(D2) In some embodiments of the radar system of (D1), the radar system transmits over N frequency subbands, where N is at least two, and further where the transmit antenna is configured to transmit the radar signal using different frequency subbands in contiguous transmission frames.

(D3) In some embodiments of the radar system of (D2), the transmit antenna is configured to incrementally increase the frequency subband used during each successive transmission frame until the Nth frequency subband is used, after which the transmit antenna resets to the first frequency subband for another iteration.

(D4) In some embodiments of the radar system of (D2), the transmit antenna is configured to incrementally decrease the frequency subband used during each successive transmission frame until the Nth frequency subband is used, after which the transmit antenna resets to the first frequency subband for another iteration.

(D5) In some embodiments of the radar system of (D2), the transmit antenna is configured to randomly select a frequency subband from among the N frequency subbands, wherein the randomly selected subband is different than a frequency band used in a transmission frame immediately preceding the given transmission frame.

(D6) In some embodiments of the radar system of at least one of (D1)-(D5), the radar system is configured for phase-modulated continuous wave (PMCW) operation.

(E1) In another aspect, a radar system includes a transmit antenna, a receive antenna, and a hardware logic component, where the hardware logic component is configured to perform acts that include: 1) causing the transmit antenna to transmit a radar signal from a transmit antenna toward a target using a first frequency subband during a first transmission frame; 2) causing the transmit antenna to transmit the radar signal using a second frequency subband during a second transmission frame; 3) causing the transmit antenna to switch subbands every transmission frame; 4) causing the receiver antenna, during each transmission frame, to operate in a frequency subband used by the transmit antenna in an immediately preceding transmission frame; and 5) detecting a radar return from the target at the receive antenna, the radar return based upon the radar signal reflecting from the target.

(E2) In some embodiments of the radar system of (E1), the transmit antenna transmits the radar signal over N frequency subbands, where N is at least two, wherein the hardware logic component is configured to cause the transmit antenna to transmit the radar signal using different frequency subbands in contiguous transmission frames.

(E3) In some embodiments of the radar system of (E2), the hardware logic component is configured to incrementally increase the frequency subband used during each successive transmission frame until the Nth frequency subband is used, after which the hardware logic component resets to the first frequency subband for another iteration.

(E4) In some embodiments of the radar system of (E2), the hardware logic component is configured to incrementally decrease the frequency subband used during each successive transmission frame until the Nth frequency subband is used, after which the hardware logic component resets to the first frequency subband for another iteration.

(E5) In some embodiments of the radar system of (E2), the hardware logic component is configured to randomly select a frequency subband from among the N frequency subbands, wherein the randomly selected subband is different than a frequency subband used in a transmission frame immediately preceding the given transmission frame.

(E6) In some embodiments of the radar system of at least one of (E1)-(E5), the hardware logic component is configured to monitor the transmitter subband sequence and provide to the receiver a subband sequence that lags the transmitter subband sequence by one transmission frame.

(F1) In still yet another aspect, use of any of the radar systems (e.g., any of (D1)-(D6) or (E1-E6)) is contemplated.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar system, the method comprising:

continuously transmitting a radar signal from a transmit antenna toward a target, wherein during a first transmission frame the radar signal is transmitted using a first frequency subband;

transmitting the radar signal using a second frequency subband during a second transmission frame, and continuing to transmit the radar signal in a continuous manner during each subsequent transmission frame, with the transmit antenna switching to a different frequency subband in each transmission frame;

ensuring that, during each transmission frame, the transmit antenna and a receive antenna are never active in the same frequency subband at the same time;

operating the receive antenna, during each transmission frame after the first transmission frame, in the frequency subband used by the transmit antenna in an immediately preceding transmission frame, such that the receive antenna is always tuned to the subband used by the transmit antenna in the immediately preceding frame, and at no point are the transmit antenna and receive antenna active in the same subband during the same frame; and receiving a radar return from the target at the receive antenna, the radar return based upon the radar signal reflecting from the target.

2. The method of claim 1, further comprising dividing a radar frequency band into N frequency subbands, where N is at least two, wherein the transmitting further comprises using different frequency subbands in contiguous transmission frames.

3. The method of claim 2, further comprising incrementally increasing the frequency subband used during each successive transmission frame until the Nth frequency subband is used, after which the transmit antenna resets to the first frequency subband for another iteration.

4. The method of claim 2, wherein the transmit antenna is configured to incrementally decrease the frequency subband used during each successive transmission frame until the Nth frequency subband is used, after which the transmit antenna resets to the first frequency subband for another iteration.

5. The method of claim 2, further comprising, for a given transmission frame, randomly selecting a frequency subband from among the N frequency subbands, wherein the randomly selected subband is different than a frequency band used in a transmission frame immediately preceding the given transmission frame.

6. The method of claim 1, wherein the radar system is configured for phase-modulated continuous wave (PMCW) operation.

7. The method of claim 1, wherein the radar system is configured for orthogonal frequency division multiplexing (OFDM) operation.

8. A radar system comprising:

a transmit antenna that transmits a radar signal toward a target, the transmit antenna being configured to:

continuously transmit the radar signal, wherein during a first transmission frame the radar signal is transmitted using a first frequency subband;

transmit the radar signal using a second frequency subband during a second transmission frame, and continuing to transmit the radar signal in a continuous manner during each subsequent transmission frame, with the transmit antenna switching to a different frequency subband in each transmission frame;

ensure that, during each transmission frame, the transmit antenna and a receive antenna are never active in the same frequency subband at the same time; and a receive antenna that receives a radar return from the target, the radar return based upon the radar signal reflecting from the target;

wherein the receive antenna is configured to operate, during each transmission frame after the first transmission frame, in the frequency subband used by the transmit antenna in an immediately preceding transmission frame, and at no point are the transmit antenna and the receive antenna active in the same subband during the same frame.

9. The radar system of claim 8, further comprising N frequency subbands, where N is at least two, wherein the transmit antenna is configured to transmit the radar signal using different frequency subbands in contiguous transmission frames.

10. The radar system of claim 9, wherein the transmit antenna is configured to incrementally increase the frequency subband used during each successive transmission frame until the Nth frequency subband is used, after which the transmit antenna resets to the first frequency subband for another iteration.

11. The radar system of claim 9, wherein the transmit antenna is configured to incrementally decrease the frequency subband used during each successive transmission frame until the Nth frequency subband is used, after which the transmit antenna resets to the first frequency subband for another iteration.

12. The radar system of claim 9, wherein the transmit antenna is configured to randomly select a frequency subband from among the N frequency subbands, wherein the randomly selected subband is different than a frequency band used in a transmission frame immediately preceding the given transmission frame.

13. The radar system of claim 8, wherein the radar system is configured for phase-modulated continuous wave (PMCW) operation.

14. The radar system of claim 8, wherein the radar system is configured for orthogonal frequency division multiplexing (OFDM) operation.

15. A radar system comprising:

a transmit antenna;

a receive antenna; and a hardware logic component that is configured to perform acts comprising:

causing the transmit antenna to continuously transmit a radar signal toward a target, wherein during a first transmission frame the radar signal is transmitted using a first frequency subband; and causing the transmit antenna to transmit the radar signal using a second frequency subband during a second transmission frame, and continuing to transmit the radar signal in a continuous manner during each subsequent transmission frame, with the transmit antenna switching to a different frequency subband in each transmission frame;

ensuring that, during each transmission frame, the transmit antenna and the receive antenna are never active in the same frequency subband at the same time;

causing the receive antenna to operate during each transmission frame after the first transmission frame in the frequency subband used by the transmit antenna in the immediately preceding transmission frame, such that the receive antenna is always tuned to the subband used by the transmit antenna in the immediately preceding frame, and at no point are the transmit antenna and receive antenna active in the same subband during the same frame; and detecting a radar return from the target at the receive antenna, the radar return based upon the radar signal reflecting from the target.

16. The radar system of claim 15, further comprising N frequency subbands, where N is at least two, wherein the hardware logic component is configured to cause the transmit antenna to transmit the radar signal using different frequency subbands in contiguous transmission frames.

17. The radar system of claim 16, wherein the hardware logic component is configured to incrementally increase the frequency subband used during each successive transmission frame until the Nth frequency subband is used, after which the hardware logic component resets to the first frequency subband for another iteration.

18. The radar system of claim 16, wherein the hardware logic component is configured to incrementally decrease the frequency subband used during each successive transmission frame until the Nth frequency subband is used, after which the hardware logic component resets to the first frequency subband for another iteration.

19. The radar system of claim 16, wherein the hardware logic component is configured to randomly select a frequency subband from among the N frequency subbands, wherein the randomly selected subband is different than a frequency subband used in a transmission frame immediately preceding the given transmission frame.

20. The radar system of claim 15, wherein the hardware logic component is configured to monitor a transmit antenna subband sequence and provide to the receive antenna a receive antenna subband sequence that lags the transmit antenna subband sequence by one transmission frame.

* * * * *